(12) United States Patent
Bareket

(10) Patent No.: US 6,971,478 B2
(45) Date of Patent: Dec. 6, 2005

(54) TAILGATE LADDER

(75) Inventor: Asaf Bareket, Ramat Gan (IL)

(73) Assignee: Asaf Metal (R.A.M.) Ltd., Ramat Gan (IL)

( * ) Notice: Subject to any disclaimer, the term of this patent is extended or adjusted under 35 U.S.C. 154(b) by 0 days.

(21) Appl. No.: 10/633,312

(22) Filed: Aug. 4, 2003

(65) Prior Publication Data

US 2004/0069566 A1    Apr. 15, 2004

(30) Foreign Application Priority Data

Sep. 19, 2002    (IL)    ..................................... 151819

(51) Int. Cl.⁷ ............................................... E06B 9/00
(52) U.S. Cl. ........................ 182/127; 182/95; 182/97; 296/62; 280/166
(58) Field of Search ............................ 182/127, 95, 97, 182/163, 164, 165, 195, 106, 156, 88, 150, 182/92, 91, 90; 280/166; 296/62; 187/95, 187/97

(56) References Cited

U.S. PATENT DOCUMENTS

| | | | |
|---|---|---|---|
| 3,606,382 A | | 9/1971 | Pollock |
| 3,853,369 A | | 12/1974 | Holden |
| 3,980,157 A | * | 9/1976 | Wrigley ........................ 182/163 |
| 4,021,071 A | * | 5/1977 | Norman ........................ 296/62 |
| 4,757,876 A | * | 7/1988 | Peacock ........................ 182/95 |
| 4,773,503 A | * | 9/1988 | Purkapile ...................... 182/22 |
| 4,815,561 A | * | 3/1989 | Ostrander ..................... 182/21 |
| 4,848,821 A | | 7/1989 | Llewellyn |
| 4,934,485 A | * | 6/1990 | Purkapile ...................... 182/20 |
| 5,205,603 A | | 4/1993 | Burdette, Jr. |
| 5,224,437 A | * | 7/1993 | Stanescu ..................... 114/362 |
| 5,487,207 A | * | 1/1996 | Rey ............................. 16/330 |
| 5,941,342 A | * | 8/1999 | Lee ............................. 182/95 |
| 6,116,378 A | | 9/2000 | Barrow |
| 6,422,342 B1 | | 7/2002 | Armstrong et al. |
| 6,622,822 B1 | * | 9/2003 | Langhoff et al. ............. 182/90 |

FOREIGN PATENT DOCUMENTS

JP    279486    * 10/1995    ............. 182/127 X

* cited by examiner

Primary Examiner—Bruce A. Lev
(74) Attorney, Agent, or Firm—Nath & Associates PLLC; Gregory B. Kang; Derek Richmond

(57) ABSTRACT

A ladder for a truck fitted with a pivotal tailgate, the ladder comprising a first leg portion pivotally coupled to a second leg portion, where at least one of the leg portions is fitted with at least one rung. An upper end of the first leg portion is pivotally attachable to an upper portion of the tailgate and a lower end of the second leg portion is pivotally attachable to a lower portion of the truck. When the tailgate is in its closed position, the first leg portion and the second leg portion continuously extend in a first operable position and opening the tailgate facilitates deploying the ladder into a corresponding second operable position.

15 Claims, 5 Drawing Sheets

TAILGATE LADDER

FIELD OF THE INVENTION

This invention relates generally to ladders, and more particularly to a truck tailgate ladder.

BACKGROUND OF THE INVENTION

Users of trucks frequently need to gain access to the truck bed from the rear. At that time it is often desirable to have one's hands free to help gain access and/or carry items to be loaded or unloaded. Trucks such as pickup trucks typically have a tailgate that can be opened to help access, however even when open to the horizontal position, the tailgate is commonly about 75 cm above the ground. A reasonable solution for ingress and egress in light of the aforementioned is to utilize a sturdy ladder that is convenient and safe to use and preferably takes little or no storage space.

Various types of ladder assemblies are known from the prior art. In U.S. Pat. No. 6,422,342, Armstrong et al disclose a stowable step with a single step platform, or rung, pivotally attached to a member that can slidably be inserted, or retracted, into a housing. The step is only supported from above by its siderails is potentially unstable. Furthermore, deployment of the ladder requires the user to retract the step which can be inconvenient if the user is carrying items to be loaded or unloaded from the truck.

In U.S. Pat. No. 4,848,821, Llewellyn discloses a similar type of ladder, though instead of being retractable it is foldable, and it has a second step. The ladder according to that patent is also attached at its top and requires manual deployment by the user. However, as it is only attached to the associated tailgate, is riot particularly stable.

To add stability, Peacock, Burdette Jr. and Barrow in their U.S. Pat. Nos. 4,757,876, 5,205,603 and 6,116,378, respectively, have features allowing their ladders to rest on the ground. However, all of these ladders require some manual deployment of the ladder by the user.

SUMMARY OF THE INVENTION

In view of the above, it is an object of the present invention to provide a ladder assembly attachable to a truck tailgate for access to the truck bed that is stable and convenient to use even for small people, particularly such a ladder that is deployable to a useful position without need for manipulation by the user.

According to the present invention there is provided a ladder for a truck fitted with a pivotal tailgate, the ladder comprising a first leg portion pivotally coupled to a second leg portion, at least one of said leg portions being fitted with at least one rung; the first leg portion being pivotally attachable to an upper portion of the tailgate such that the first leg portion extends behind the tailgate; whereby when the tailgate is in its closed position the first leg portion and the second leg portion continuously extend in a first operable position and opening the tailgate facilitates deploying the ladder into a corresponding second operable position.

According to one particular embodiment of the invention, the second leg portion of the ladder is pivotally attachable to a lower portion of the rear of the truck, whereby opening the tailgate entails spontaneous deployment of the ladder into its second operable position.

According to one specific embodiment, at least the first leg portion comprises two parallely extending siderails with one or more rungs parallely disposed therebetween. The second leg portion comprises, according to one modification, only a single rail and according to a second modification, two such rails, parallely extending and optionally fitted with one or more rungs parallely disposed therebetween.

According to a modification of the invention the second leg portion is free, whereby said second leg portion is swingable such that its bottom end is engageable with the ground. According to one particular aspect of this arrangement, the pivot joint between the first and second leg portions is fixable such that the angular position of the second leg portion can be fixed.

Advantages of the ladder assembly of the present invention include, but are not limited to, the following:

The ladder is stable since it is supported, according to one of its embodiments, at its lower end as well as its upper end;

If the user desires access to the rear of the truck with the tailgate closed, there is no additional operation or deployment necessary to conveniently use the ladder;

If the user desires access to the rear of the truck with the tailgate open, the ladder is deployed simply by opening the tailgate;

When the tailgate is open the ladder has a particularly low first step for easy access even by short people;

The ladder is ready for use (when the tailgate is up/closed) or spontaneously/automatically deployed, i.e. in a hands-free manner, allowing convenient use even when loading or unloading items, simply by opening the tailgate.

BRIEF DESCRIPTION OF THE DRAWINGS in order to understand the invention and to see how it may be carried out in practice, some embodiments will now be described, by way of non-limiting examples only, with reference to the accompanying drawings, in which:

FIG. 1 is a rear perspective view of a ladder according to a first embodiment of the present invention, attached to a tailgate and a bumper of a pickup truck, wherein:

DETAILED DESCRIPTION OF THE INVENTION

Figure 1A:
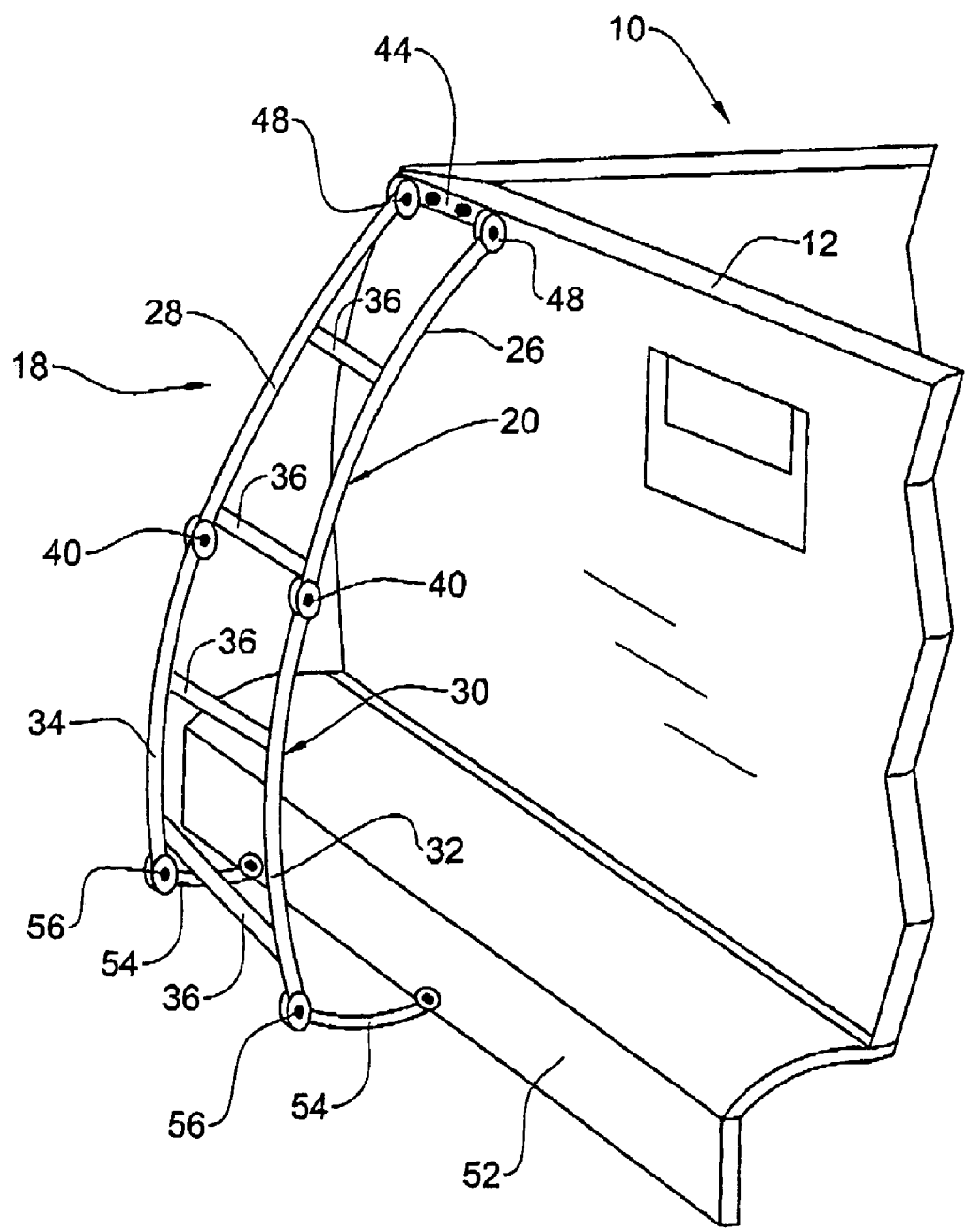
FIG. 1A illustrates the tailgate in its closed, essentially upright position.
Figure 1B:
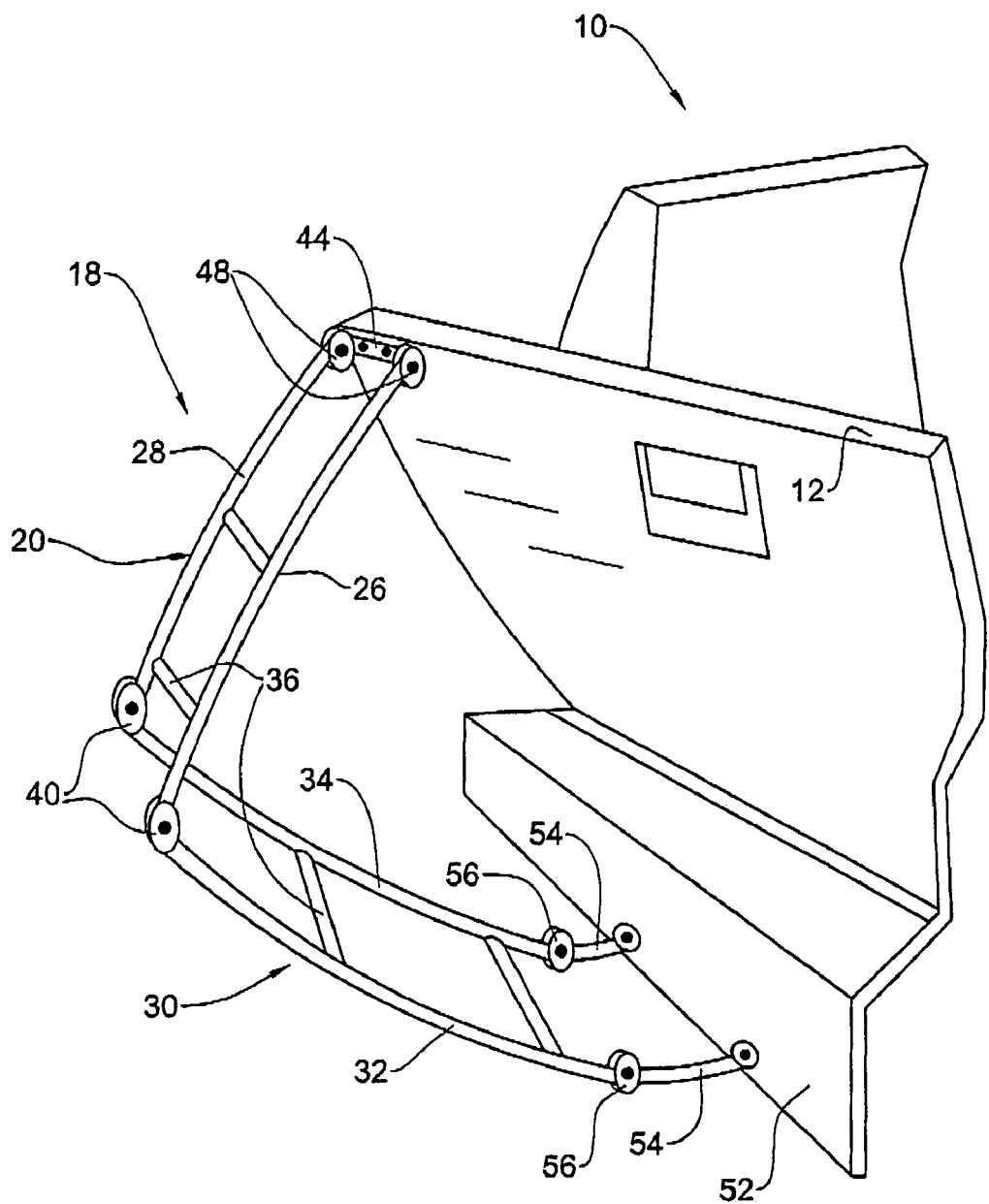
FIG. 1B illustrates the tailgate partially open.
Figure 1C:
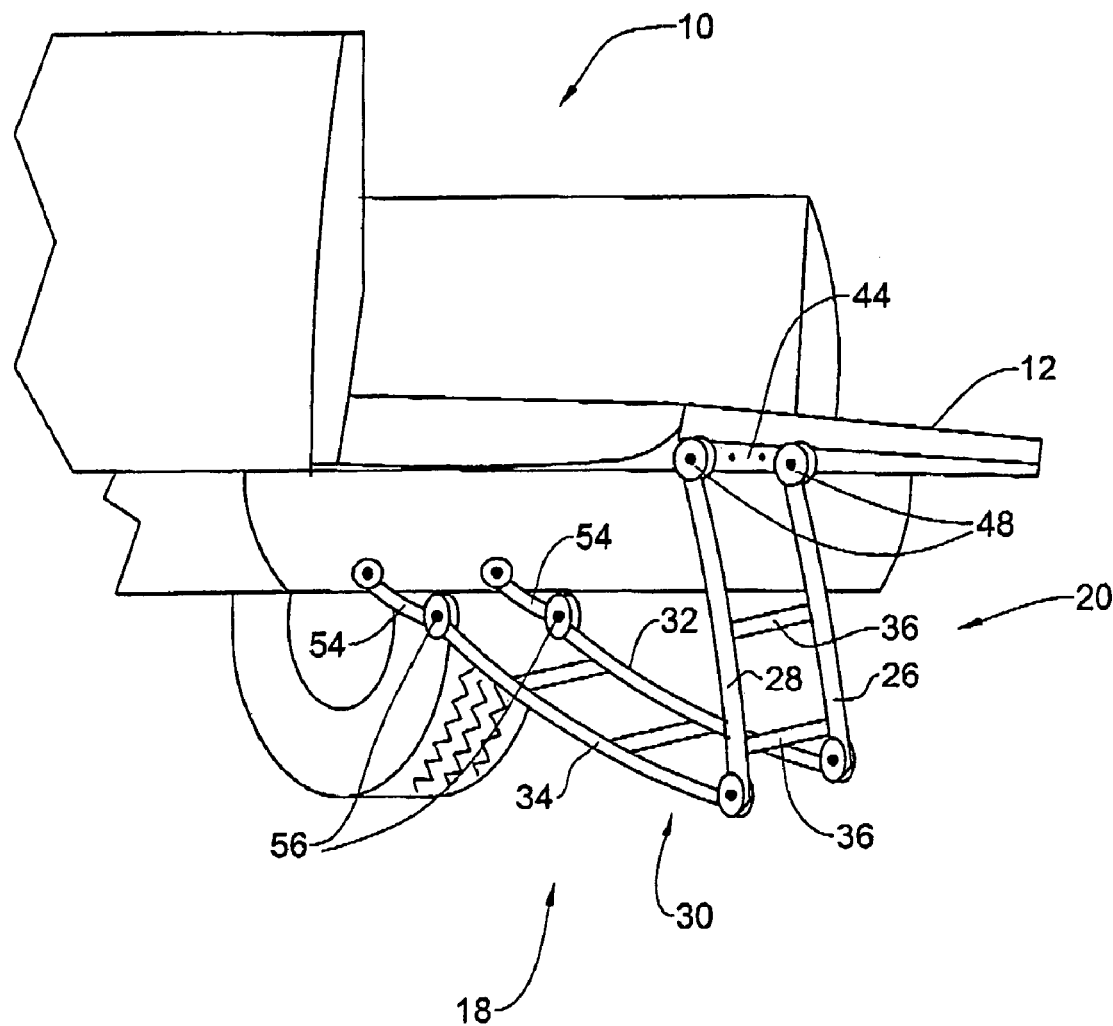
FIG. 1C illustrates the tailgate fully opened, essentially horizontal position.

Referring first to FIGS. 1A–1C, there is illustrated a rear portion of a pickup truck 10 (or any other truck fitted with a tailgate) fitted with a tailgate 12, illustrated in. FIG. 1A in its closed, essentially vertical position, in FIG. 2 in a midway open position and in FIG. 1C in its open position, i.e., essentially horizontal and flat with the bed of the truck.

A ladder, generally designated 18, is provided, the ladder comprising a first leg portion 20 comprising in turn two parallely extending siderails 26 and 28 and a second leg portion 30 comprising two parallel siderails 32 and 34 with several rungs 36 parallely fitted between the side rails.

It is noticed that the first leg portion 20 is pivotally articulated to the second leg portion 30 by means of a pair of pivot hinges 40. Further noticed, the top end of the first leg portion 20 is hingedly attached to a top end of the tailgate 12 by a corresponding attachment bracket 44 hingedly articulated to the siderails 26 and 28 by a pair of pivot hinges 48. The lower end of the second leg portion 30 is connected to a lower end of the truck 10, in this embodiment, to a bumper 52 by means of support legs 54 pivotally articulated to siderails 32 and 34 by pivots 56.

However, it is to be appreciated that rather than support legs 54, siderails 32 and 34 may be integrally fitted with suitable extensions pivotally articulated to the bumper 52 or to a different location at a lower portion at the rear end of the truck 10, such as its chassis.

It is noticed that hinges 40 coupling between the first leg portion 20 and the second leg portion 30 extends behind (i.e. rearward) of the attachment bracket 44 attached to the tailgate 12 and the attachment to the bumper 52 at pivot 56.

It is further seen from the consecutive illustrations of FIGS. 1A, 1B and 1C that the ladder 18 is already in an operable position when the tailgate 12 is closed, i.e., in its essentially vertical, upright position of FIG. 1A, and that the ladder is deployed to an alternative operative position merely by opening the tailgate (seen midway in FIG. 1B and fully opened, namely flat with the bed of the truck 10 in FIG. 1C). Furthermore, the position of FIG. 1C is such that the lowermost of rungs 36 of the first leg portion 20 is in a lowermost position thereby providing easy access for even short people or when the truck 10 is positioned on an uneven surface.

It is now appreciated that closing the tailgate 12 into the position of FIG. 1A entails simultaneous corresponding shifting of the ladder 18 into its expanded position allowing a person to use the ladder to climb into the bed of the truck 10 over the closed tailgate 12.

An advantage of a configuration illustrated in FIGS. 1A–1C is that the truck may be used also when the tailgate 12 is in its open position as suitable for carrying long cargo whereby one may drive the truck in this position and the ladder 18 does not cause any disturbances as it will not engage the ground.

Figure 2:
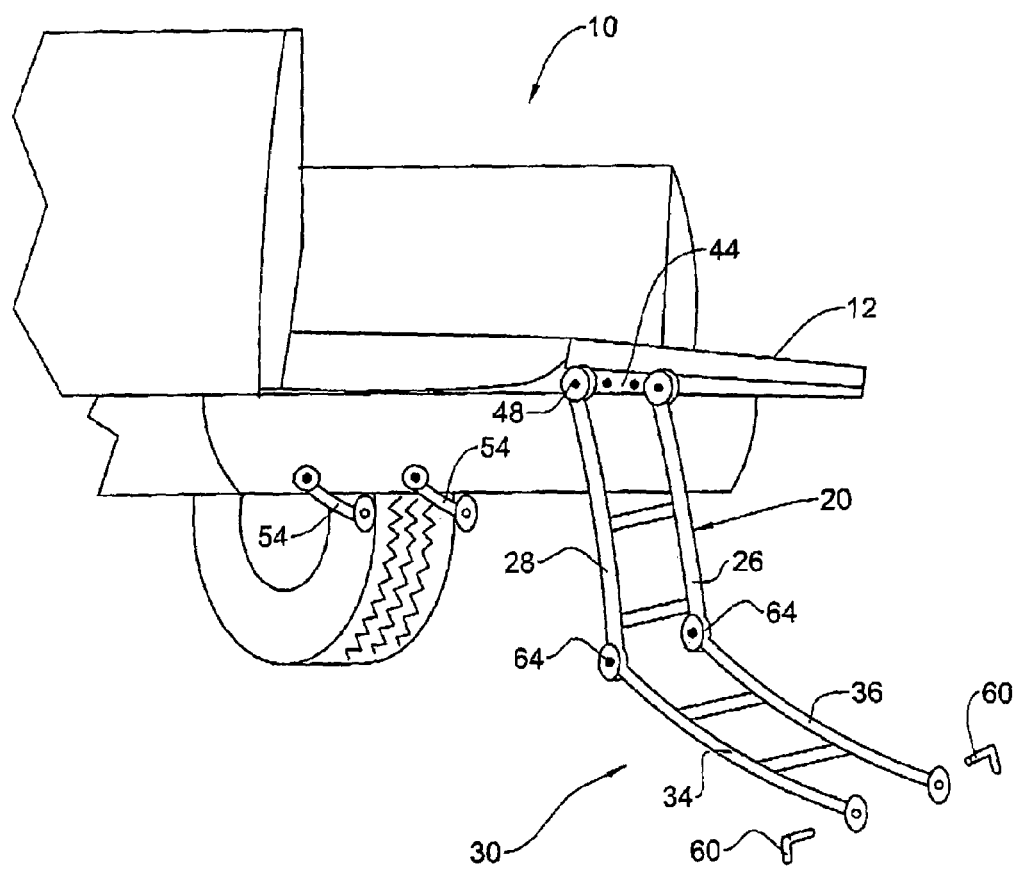
FIG. 2 is a rear perspective view illustrating a modification of the embodiment of the ladder according to FIG. 1, the ladder unattached to the bumper of the truck.

Turning now to the embodiment of FIG. 2, the same reference numbers are used for describing similar components as in the embodiment of FIGS. 1A–1C. The embodiment of FIG. 2 differs from the embodiment of FIGS. 1A–1C in that the lower ends of the second leg portion 30 are detachable from the support legs 54 merely by detaching connecting pivot pins 60, thus allowing the second leg portion to swing down into engagement with the floor or ground, as seen in FIG. 2. This position is in particular useful when the truck 10 is standing on uneven terrain or when there exists a barrier.

In accordance with still another embodiment, the pivots 64 connecting between the first leg portion 20 and the second leg portion 30 are fixable such as to arrest the second leg portion 30 at a variety or any angular position with respect to the first leg portion 20.

Figure 3:
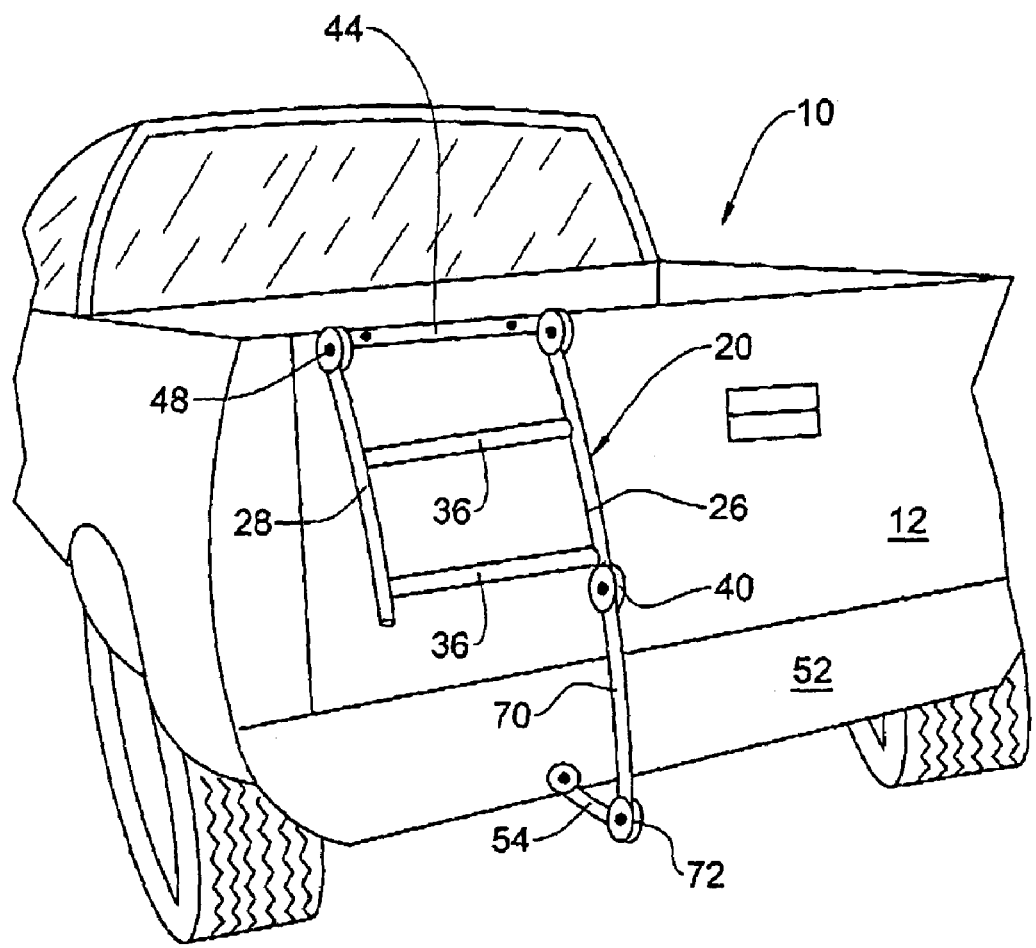
FIG. 3 is a rear perspective view of a ladder according a different embodiment, wherein the ladder has one lower support leg.

Turning now to FIG. 3 of the drawings, there is illustrated still a different embodiment of the present invention differing from the first embodiment of FIGS. 1A–1C in that the second leg portion comprises a single leg member 70 having an upper end thereof pivotally coupled to a lower end of the side rail 26 of the first leg portion 20 and its lower end being pivotally coupled at 72 to the support leg 54 as in the embodiment of FIGS. 1A–1C. Thus embodiment allows for a lower cost, lighter weight ladder that can be more quickly assembled and disassembled.

The ladder described above is preferably made of a strong material resistant to outdoor environmental conditions such as a metal, for example aluminum or possibly an appropriate plastic material. The siderails can be provided with a roughened surface for improved hand gripping as can, the rungs for improved footing.

Still another embodiment of the invention may include suitable locking means for locking the pivot located between the first and second leg portion to thereby prevent unauthorized opening of the tailgate. This may be facilitated by locking the binge 40 of FIG. 1A, to thereby prevent opening the tailgate 12.

According to one particular embodiment (not illustrated), the side rails of the leg portions are made of pre-fabricated modular components so that like elements are connectable to one another to obtain the desired structure. Such elements may be pivotally fixable to one another so as to achieve different constructions conforming with shape and size of a truck's tailgate. However, it is advantageous that such pivotal coupling be changeable to facilitate reconfiguration as well as easy assembly.

It should be noted that various components of the ladder described above, as well as variations thereof are provided merely by way of illustration and are by no means exclusive, and many variations and modifications thereof are possible.

What is claimed is:

1. A ladder adapted to be secured to a truck fitted with a pivotal tailgate, the ladder comprising
    a first leg portion pivotally coupled to a second leg portion, at least one of said leg portions being fitted with at least one rung;
    an upper end of the first leg portion adapted to be pivotally attachable to an upper portion of the tailgate and a lower end of the second leg portion adapted to be pivotally and releasably secured to a support member projecting from any rigid portion of the truck,
    wherein, at an end of the support member and at a lowermost point of the second leg portion, there is a pivot for pivotally articulating the second leg portion,
    whereby when the tailgate is in its closed position, the first leg portion and the second leg portion are adapted to continuously extend over the tailgate in a first operable position and opening the tailgate is associated with spontaneous and automatic deploying the ladder into a corresponding second operable position.

2. A ladder according to claim 1, wherein the location that the first leg portion is adapted to be attached to the tailgate and the location that the second leg portion is adapted to be attached to the truck both extend forward of the location where said first leg portion is coupled to said second leg portion.

3. A ladder according to claim 2, wherein at least the first leg portion comprises two parallely extending side rails with the at least one rung parallely disposed therebetween.

4. A ladder according to claim 1, wherein the second leg portion comprises a single support leg.

5. A ladder according to claim 1, wherein the second leg portion is swingable rearwardly upon detachment from the truck.

6. A ladder according to claim 1, wherein the first leg portion and the second leg portion are lockably coupled to thereby prevent displacing the tailgate into an open position.

7. A ladder according to claim 1, wherein between the fist leg portion and the second leg portion there is a hinge fixable at a plurality of intermediate positions to thereby facilitate arresting the second leg portion at a plurality of corresponding angular positions with respect to the first leg portion.

8. A ladder according to claim 1, wherein the ladder is adapted to be spontaneously deployed to a second operable position upon opening the tailgate and where at said second operable position there is a rung accessible at a level lower than where the ladder is adapted to be fastened to the lower portion of the truck.

9. A ladder according to claim 1, wherein the lower portion of the truck to which the second leg portion is adapted to be attachable is a bumper of the truck.

10. A ladder according to claim 1, wherein the lower portion of the truck to which the second leg portion is adapted to be attachable is a lower rear portion of a chassis of the truck.

11. A ladder according to claim 1, wherein the lower ends of the second leg portion are pivotally connectable to a support leg by removable pivot pins.

12. A ladder according to claim 11, wherein the ladder maybe deployed such that it is supported at its lower end by the ground surface.

13. A ladder according to claim 11, wherein the second leg portion may be arrested at any angular position by a pivot hinge extending between the first leg portion and the second leg portion lockable at several angular positions.

14. A ladder according to claim 1, wherein both the first leg portion and the second leg portion each comprise two parallely extending side rails that are made of pre-fabricated modular components.

15. A ladder according to claim 14, wherein pre-fabricated members of the side rails are pivotally fixable to one another.

* * * * *